United States Patent Office
3,564,037
Patented Feb. 16, 1971

3,564,037
NOVEL POLYSILOXANE-POLYALKYLENE COPOLYMERS
Jean Claude Auguste Delaval and Paul Alfred Eugene Guinet, Lyon, Jean Marius Ernest Morel, Rhone, and Robert Raphael Puthet, Lyon, France, assignors to Rhone-Poulenc S.A., Paris, France, a French body corporate
No Drawing. Filed Dec. 18, 1967, Ser. No. 691,210
Claims priority, application France, Dec. 29, 1966, 89,368
Int. Cl. C07f 7/18
U.S. Cl. 260—448.8       12 Claims

ABSTRACT OF THE DISCLOSURE

The invention relates to copolymers of general formula

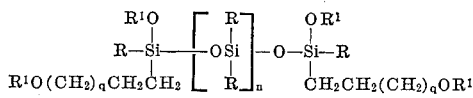

wherein R is an alkyl, cycloalkyl, phenyl, alkylphenyl or phenylalkyl group, $n$ is between 2 and 700, $q$ is 0 to 3, and $R^1O$— is a group of general formula $A(C_xH_{2x}O)_y$, wherein $x$ is 2 to 4, $y$ is at least one, and A is hydroxy, formyloxy, —OG, —OCOG,

—NHG, —OCONHG or —NHCOG, wherein G is a hydrocarbon radical. The copolymers are useful as surface active agents in the preparation of polyurethane foams.

---

The present invention relates to new diorganopolysiloxanepolyoxyalkylene block copolymers, to processes for preparing them, and to the process for preparing polyurethane foams employing them.

French patent specification No. 1,125,436 describes copolymers having polysiloxane units and polyoxyalkylene units, obtained by condensing a polyalkylene-glycol monoether with a polyalkoxypolysiloxane, the reaction generally being carried out in the presence of acid catalysts such as trifluoroacetic acid. Copolymers of this type are called block copolymers.

Subsequently, in accordance with French Pat. 1,313,814, linear organohydrogenopolysiloxanes were reacted with polyalkylene-glycol monoethers in the presence of alkali alcoholate as catalyst, with evolution of hydrogen, to give a compound having Si—O—C bonds.

On the other hand, copolymers having Si—C bonds have been described in French Pat. 1,327,546, in which a polyalkylene-glycol diether possessing an allyl group is attached to a hydropolysiloxane in the presence of a catalyst such as chloroplatinic acid.

It is interesting to find that all the copolymers hitherto obtained, regardless of their origin or their mode of preparation, are surface-active agents which can be very widely employed in the preparation of polyurethane foams.

It has now been found that reaction of linear polysiloxanes having alkyl dihydrosilyl groupings at the two ends of the siloxane chain with polyalkylene-glycol monoethers and polyalkylene-glycol derivatives containing alkenyloxy groupings at one of the ends, gives the new block copolymers of the invention having the formula:

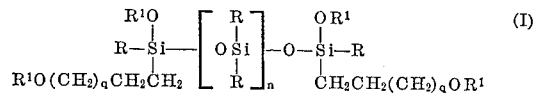

wherein the groups R, which are identical or different are unsubstituted or halo- or cyano-substituted lower alkyl groups, unsubstituted or mono- or di-halo-substituted cycloalkyl groups having up to 6 ring carbon atoms, phenyl, alkylphenyl or phenylalkyl; $n$ is a number between 2 and 700; $q$ is 0 or a number up to 3; the groups $R^1O$—, which are identical or different radicals, are of the general formula $A(C_xH_{2x}O)_y$, wherein $x$ is a number from 2 to 4; $y$ is a number of at least 1, the groups $(C_xH_{2x}O)$ of the same symbol $R^1O$— being either identical or different when $y$ is higher than 1; and A is a hydroxy, formyloxy, —OG, —OCOG,

—NHG, —OCONHG, and —NHCOG radical, wherein G is a hydrocarbon radical having up to 30 carbon atoms.

Examples of suitable R groups are saturated alkyl radicals having up to 4 carbon atoms, such as methyl, ethyl, propyl, isopropyl, butyl, chloromethyl, trifluoropropyl, β-cyanoethyl or γ-cyanopropyl, cycloaliphatic groups such as cyclopropyl, cyclobutyl, cyclopentyl, cyclohexyl, dichlorocyclopropyl, fluorocyclobutyl, or fluorocyclohexyl, alkylphenyl groups such as tolyl, xylyl and cumenyl, and phenylalkyl radicals such as benzyl and phenylethyl. The groups $(C_xH_{2x}O)$ are preferably $(CH_2CH_2O)$ or

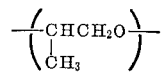

groups and the radical G is suitably a group free from aliphatic unsaturation, such as methyl, isopropyl, butyl, decyl, dodecyl, octadecyl, docosyl, octacosyl, phenyl, benzyl or diphenyl.

The process of the invention is one for preparing the above copolymers which comprises (a) reacting a linear diorganopolysiloxane of general Formula II

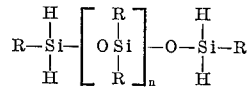

wherein R and $n$ are as defined above, with a compound of general Formula IX $$XOR^1$$

wherein $R^1$ is as defined above and X is hydrogen, or a group of general formula $CH_2=CH—(CH_2)_q$— wherein $q$ is as defined above, in the presence of a reactant-inert organic diluent, in a mole ratio of diorganopolysiloxane to the compound of general Formula IX of 1:2, and in the presence of a catalyst for the addition of Si—H bonds, respectively, hydroxy or vinyl groups to give a compound of general Formula X

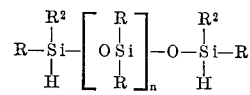

wherein the $R^2$ groups are respectively both $OR^1$ or both —$(CH_2)_2(CH_2)_qOR^1$, and then (b) reacting the compound of general Formula X with a compound of general Formula IX wherein X is respectively a group of general formula $CH_2=CH—(CH_2)_q$— or hydrogen, in the presence of a reactant inert organic diluent, in a mole ratio of the compound of general Formula IX to the compound of general Formula X or not less than 2, and in the presence of a catalyst for the addition of Si—H bonds to, respectively, vinyl or hydroxy groups.

The process, in one variant, involves:
(a) Reacting a linear diorganopolysiloxane of the Formula II with a derivative of a polyalkylene-glycol of the Formula $R^1OH$ in a mole ratio of diorganopolysiloxane to polyalkylene glycol of 1:2, in the presence of a catalyst for the reaction of Si—H bonds with alcohols, in an organic diluent which is inert to the reactants employed, to give copolymers of the general Formula III:

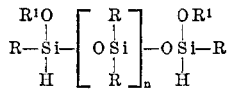

produced in accordance with the reaction diagram $$(II) + 2R^1OH \rightarrow (III) + 2H_2$$

(b) Reacting the crude copolymers (III) which are preferably not isolated, obtained under (a), in solution in the diluent, with a polyalkylene-glycol ether of the Formula IV:

$$CH_2=CH(CH_2)_qOR^1$$

in which the mole ratio of the polyalkylene glycol (IV) to the copolymer (III) is equal to or greater than 2 in the presence of a catalyst for the addition of Si—H bonds to vinyl groups in order to obtain, after elimination of the diluent, the copolymers of the invention of Formula I produced in accordance with the reaction diagram $$(III) + 2CH_2=CH-(CH_2)_qOR^1 \rightarrow (I)$$

q having the same values as already mentioned.

The diorganopolysiloxanes of Formula II are readily obtainable, for example, as described in French patent specification No. 1,404,561, by reaction of two mol of a dihydrosilane posessing a hydrolysable grouping having an acid or basic reaction, with 1 mol of a diorganopolysiloxane, each end of which is terminated by a hydroxy radical.

The polyalkylene-glycols of the formula $R^1OH$ are known compounds and their preparation and properties are described, for example, in N. G. Gaylord, "Polyethers. Part I Polyalkylene oxides and other polyethers." Thus, an alcohol, an acid, an amine or an amide may be reacted with a 1-2-epoxy compound which is suitably ethylene and isopropylene oxide.

The derivatives of polyalkylene-glycol ethers of Formula IV can be prepared by known reactions in which the hydroxy group of an alkenic monoether of a polyalkylene-glycol is reacted with an acid anhydride, or an alkyl chloroformate or isocyanate. In a variant, the hydroxy grouping of a polyalkylene-glycol $R^1OH$ may in some cases be converted to OMe, Me being an alkali or alkaline-earth metal, and may be reacted with an alkenyl chloride, or again the group OH of an unsaturated monoether of a polyalkylene-glycol may be converted to OMe and reacted with an alkyl or acid chloride. The molecular weight of these polyalkylene glycols can vary within wide limits, but preferably liquids of molecular weight between 250 and 25,000 are employed.

Examples of the catalysts for the reaction of hydrosilanes with the alcohols, are optionally substituted hydroxylamines (see French patent specification No. 1,411,-228), metals such as copper, platinum or nickel, metallic halides such as palladium or platinum chloride, hexachloroplatinic acid, metallic salts of carboxylic acids such as tin or lead octoate, or bases such as potassium or sodium alcoholate.

The quantity of catalyst for this condensing reaction is generally small, and varies with the nature of the catalyst, it being between 0.001% and 3% by weight calculated on the polysiloxanes (II) in the case of hydroxylamines, the metallic salts and the alkali-metal alcoholates, and between 0.0001% and 1% by weight calculated on the polysiloxanes (II) in the case of the metals and their halides.

The catalyst for the attachment of the SiH bonds to the vinyl groups is preferably platinum or one of its derivatives, such as platinum black, hexachloroplatinic acid, platinum di-, tri- and tetra-chloride, the platinum chloride-olefin complexes, and the reaction products of hexachloroplatinic acid with organic compounds having functional groups, such as those described in French patent specification No. 1,367,044. It is also possible to use platinum deposited upon carbon black, slica gel or γ-alumina. Preferably between 0.01 and 1.5 part of metal is employed to 100 parts by weight of vinyl groupings.

As mentioned above, in stage (a) of the process, diorganopolysiloxane (II) is condensed with the polyalykylene-glycol of formula $R^1OH$ in a diluent and in the presence of a condensation catalyst. In a preferred embodiment of the process of the invention, the diorganopolysiloxane (II) is introduced into an appropriate receptacle, such as a round-bottomed flask or a reactor of any shape and dimensions, simultaneously with an appropriate diluent which is inert to the reactants employed, such as petroleum ethers of a boiling point of more than 90° C., benzene, toluene, xylene, cumene, chlorobenzene or orthodichlorobenzene.

The ratio of diluent to organopolysiloxane (II) has no fundamental importance, it being necessary for the quantity of diluent to be sufficient to solubilise the diorganopolysiloxane and to permit the subsequent condensation reaction with the compound $R^1OH$ to take place in homogeneous medium. It is advantageous to employ in general to 100 parts of diorganopolysiloxane (II) from 150 to 400 parts of diluent. The diorganopolysiloxane and the diluent are always substantially anhydrous, but in order to eliminate the traces of water present, it is often desirable to eliminate a few grams of diluent by heating at boiling point.

To this anhydrous solution of diorganopolysiloxane (II) and diluent at a temperature between ambient temperature and its boiling temperature, a dehydrated mixture comprising the polyalkylene-glycol derivative $R^1OH$ optionally a diluent and the catalyst for the condensation of the Si—H and C—OH bonds, was added.

The polyalkylene-glycol derivative $R^1OH$ employed in twice the molar quantity of the organopolysiloxane (II) may be accompanied by a diluent identical to that referred to in the foregoing. Generally, from 0 to 100 parts of diluent to 100 parts of compound $R^1OH$ is suitable. Moreover, the condensation catalyst, whether it be a metallic derivative or a different compound, may be previously dissolved in various concentrations in the compound $R^1OH$ or in the diluent, or in a mixture of these two products. When the catalyst is metallic, it may be introduced in pulverised form. The duration of the introduction of the mixture of $R^1OH$, catalyst and diluent, where necessary, into the diorganopolysiloxane (II)—diluent solution is not critical, and it may in practice be instantaneous or be spread over a period of one hour or more. The liberation of hydrogen occurs from the beginning of the contact between the reactants and continues for a variable time which may be as long as 10 hours. In fact, with some of the aforementioned catalysts, the liberation stops when half of the Si—H bonds present have completely reacted with the polyalkyleneglycol derivative $R^1OH$. This condensation reaction may take place at ambient temperature or at the boiling temperature of the mixture, the speed of reaction naturally being increased when heating is applied.

It is to be understood that, in this first stage, the order of the addition of the reactants is not critical and that procedures other than that just described may be adopted. Thus, all the reactants may be added together and the mixture may thereafter be agitated until the end of the liberation of the hydrogen, or the mixture of organopolysiloxane (II), $R^1OH$ and diluent may be slowly introduced into a reactor containing the catalyst in solution or in dispersion in a small quantity of diluent or of reactants.

Regardless of the method employed, copolymers of the Formula III are finally formed, which are not isolated and which are kept as they are in the diluent. However, for carrying out the second phase of the reaction, it may be advantageous to eliminate the condensation catalyst, more particularly when it is likely to inhibit the action of the catalyst for the attachment of the Si—H bonds to the vinyl bonds. In this case, therefore, separation of the catalyst by filtration, distillation or precipitation by formation of complexes is performed. The structure of the copolymers of Formula III is confirmed by infra-red spectral analysis. The characteristic vibration bands of the groups —OSiH₂R disappeared and were completely replaced by those of the groupings

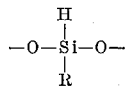

In stage (b) of this variant of the process of the invention, the crude product, i.e. the copolymer of Formula III and the diluent, is reacted with the polyalkylene-glycol ether of Formula IV having a vinyl terminal group. For this purpose, in a preferred method of the invention, there is introduced into the solution brought to boiling point and containing the copolymer (III) a previously dehydrated mixture comprising polyalkylene-glycol ether (IV), a diluent of the type previously described and a catalyst for the attachment of the Si—H bonds to the vinyl compounds. The complete attachment of the Si—H bonds is rather difficult in some cases and generally necessitates a very lengthy period of heating under reflux, which may be as much as 50 hrs.

At least 2 mol of polyalkylene-glycol ether (IV) are used per mol of copolymer (III) so as to avoid leaving unreacted Si—H bonds; a molar excess which may range up to 15% is completely acceptable. The quantities of diluent which accompany the polyalkylene-glycol ether (IV) are not critical and from 100 parts to 300 parts to 100 parts of polyalkylene represent an appropriate range.

Although it is preferred that stage (b) of the reaction is achieved by the addition of the mixture of the compound (IV), the catalyst and diluent to the mixture (III) and diluent, it is clear that the reverse may readily be carried out. Likewise, the various reactants may be directly mixed together and thereafter brought to temperatures between ambient temperature and the boiling point of the mixture. Finally, in accordance with another variant, the mixture of compound (IV), compound (III) and diluent may be slowly added to the catalyst so that the reaction for the attachment of the Si—H bonds to the vinyl groups takes place in proportion as the reactants are introduced into the reactor containing the catalyst.

These various modes of carrying out the process of the invention often depend upon factors which are closely associated with the nature of the reactants, the quantities to be employed and the reaction temperature.

As already indicated, complete saturation of the vinyl groupings by Si—H bonds is rather difficult, and it is therefore preferable to add the catalyst in a number of stages in the course of the reaction. When the reaction is substantially complete, or when it ceases, which can readily be checked by taking specimens and titrating the Si—H and vinyl bonds, it is often advantageous, before eliminating the solvent, either to neutralise with sodium bicarbonate any traces of acidity present which result from certain catalysts such as platinum chlorides (these proportions of bicarbonate may be fairly high; preferably proportions representing about 10% by weight of copolymer (I) formed are employed), or to treat the mixture with charcoal or an activated earth. The solvent is thereafter eliminated by evaporation under reduced pressure, the residue is filtered and the copolymer of (I) is collected, the surface-active properties of the said copolymer and its degrees of solubility in water, the alcohols and the usual solvents being a function, not only of the molecular weight, but also of the nature of the units composing the polyoxy-alkylene chain and of the organic substituents attached to the silicon. More precisely, if high solubility in water is required, it is necessary for the polyoxyalkylene chain to be composed, for example, of 50% of units ⁺CH₂CH₂O⁺ and 50% of units

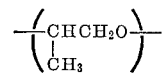

and for the organic substituents attached to the silicon atoms to be methyl radicals.

The second variant of the process of the invention comprises reacting a linear diorganopolysiloxane of general Formula II, wherein R and $n$ have the meanings given above, with a polyalkylene-glycol ether of general Formula IV, wherein $R^1$ and $q$ have the meanings given above, in a mole ratio (II):(IV) of 1:2, in an organic diluent which is inert to the reactants employed and in the presence of a catalyst for the addition of the Si—H bonds to the vinyl groupings, so as to prepare in a first stage, preferably without isolation, a copolymer of general Formula V:

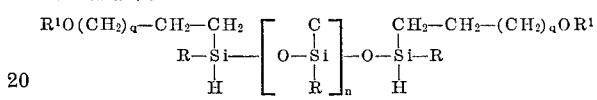

then reacting these copolyers (V) in solution in the diluent with a polyalkylene-glycol derivative of the formula $R^1OH$ in a mole ratio $R^1OH$:(V) of 2, in the presence of catalysts for the reaction of hydrosilanes with the alcohols.

The new copolymers of general Formula I may be employed in many applications in which surface-active polysiloxane-polyoxyalkylene block copolymers which are stable to hydrolysis are employed; they may be used more particularly in the preparation of polyurethane foams by the so-called single-phase process, which imparts good stability to the mass being foamed, before it completely hardens, and renders possible the production of flexible or rigid foams of very good quality. More particularly for the preparation of rigid foams, the copolymers of the invention have superior activity to the hitherto known products.

In addition, they may be used alone or in admixture with other polysiloxane-polyoxyalkylene block copolymers as mould release agents, lubricants for moving surfaces subjected to high temperatures and heavy loads, heat transfer fluids and emulsifying agents for mixtures of water and oily, resinous or gummy polysiloxanes.

The following examples illustrate the invention.

EXAMPLE 1

An α,ω - bis-(dihydromethylsilyl)polydimethylsiloxane (114.3 g.; 0.0666 mol) of average formula:

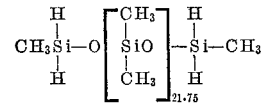

and toluene (420 cc.) in a two-litre round-bottomed flask provided with a thermometer, a stirring system, a dropping funnel and a Dean and Stark separator on which a reflux condenser is mounted, was azeotropically dehydrated for 2 hrs. by removal of toluene (25 cc.) and was then treated through the dropping funnel with a dry mixture (321.8 g.) of a polyethylene-polyisopropylene-glycol butyl monoether (226.6 g.; 0.133 mol) of the average formula:

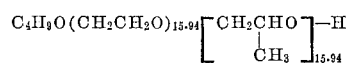

toluene (110 cc.) and of hexachloroplatinic acid hexahydrate ($H_2PtCl_6 \cdot 6H_2O$ in the above butyl monoether (0.16 ml.; 0.4125 g. of platinum/100 cc. or 0.66 mg. of platinum) over 5 minutes, and the mixture refluxed for 8 hrs. after which time the volume of hydrogen evolved represented 99% of the theoretical volume which would be produced by the reaction of one half of the Si—H bonds of the α,ω-bis-(dihydromethylsilyl)polydimethylsiloxane with the hydroxy groups of the butyl monoether of polyethylene-polyisopropylene-glycol. Infra-red spectroscopy indicated that the two characteristic absorption band of the groups

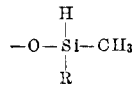

between 10.3 and 10.6μ were absent and that only the characteristic absorption band of the grouping.

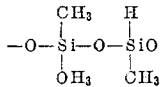

at about 10.9–11μ was present.

The refluxing mixture was treated over 5 mins. through the dropping funnel with an azeotropically dry mixture of the acetate (250.5 g.; 0.147 mol) of the allyl monoether of a polyethylene-polyisopropylene-glycol of the average formula

and toluene (430 cc.).

After stirring at boiling point for 10 mins., the above catalyst solution (4.7 cc. or 19.4 mg. of platinum) was added, refluxing maintained for 3 hrs., catalyst solution (4.7 cc.) added and finally refluxing was continued for 9 hrs.

Cooling to ambient temperature gave a brown-coloured clear solution to which sodium bicarbonate (59 g.) was added, the mixture stirred for 30 mins. at 100° C., and the toluene removed by distillation under progressively reduced pressure down to a vacuum of 5 mm. Hg and a temperature of 80° C. Filtration gave a homogeneous brownish oil (590 g.) [viscosity at 25° C.: 1800 cst.; percent of hydrogen (by weight) in the form of Si—H bonds: 0.0009 (98% conversion of the Si—H bonds); percent of vinyl grouping (by weight): 0.094 (96% conversion of the vinyl groups)].

EXAMPLE 2

A refluxing mixture of hexacholrplatinic acid in the polyether mentioned below (0.3 cc. containing 1.25 mg. of platinum) and anhydrous toluene (150 cc.) in a one-litre round-bottomed flask provided with a stirrer, a thermometer, a dropping funnel and a reflux condenser was treated over 3 hrs. through the dropping funnel with an allyl-butyl diether (108 g.; 0.05 mol of a polyethylene-polyisopropylene-glycol of the formula:

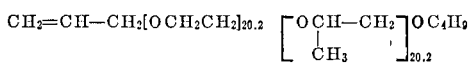

(molecular weight 2160; 1.25% by weight of vinyl groups), toluene (290 cc.) and an α,ω-bis-(dihydromethylsilyl)polydimethylsiloxane (46 g.; 0.025 mol) of the formula:

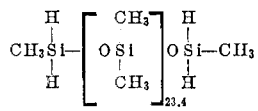

(molecular weight 1840; 0.217% by weight of Si—H bonds) and was refluxed for 1 hr.; catalyst solution (0.3 cc.) was added and the refluxing continued for a further 2 hrs. At this stage, it was found by titration that 49% of Si—H bonds remained. Infra-red spectrographic analysis indicated that the characteristic absorption bands of the bonds

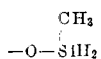

had disappeared and the characteristic absorption band of the group:

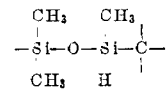

at about 11μ, was present.

The refluxing mixture was treated over 5 mins. through the dropping funnel with a dry mixture of a polyethylene-polyisopropylene-glycol butyl monoether (85 g.; 0.05 mol) of the formula:

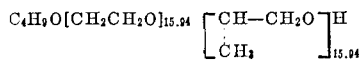

(molecular weight: 1700; 1% by weight of OH) and toluene (40 cc.); anhydrous diethylhydroxylamine (0.2 cc.) was added, the mixture boiled for 1½ hrs. diethylhydroxylamine (0.2 cc.) added, and the mixture again refluxed for 3½ hrs. Diethylhydroxylamine (0.2 cc. was then added and the mixture finally refluxed for 1 hr. During this 6 hr. period, a volume of hydrogen was evolved corresponding to the reaction of 49% of Si—H bonds with the polyalkylene-glycol monoether. The solvent was removed under reduced pressure to give a clear oil having a viscosity of 5000 cst. at 25° C.

The use of this oil in a formulation for the preparation of polyurethane foams, resulted in cellular products of excellent quality.

EXAMPLE 3

An α,ω-bis - (dihydromethylsilyl)polydimethylsiloxane of the average formula

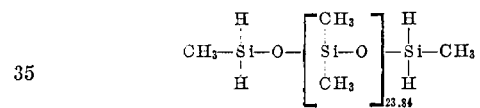

in toluene (110 cc.) in a one-litre round-bottomed flask equipped as described in Example 1 was azeotropically dehydrated by removal of toluene (10 cc.), and the refluxing mixture treated over ¾ hr. through the dropping funnel with a dry mixture of a butyl monoether (94.4 g.; 0.05 mol) of a polyethylene-polyisopropylene-glycol of the average formula:

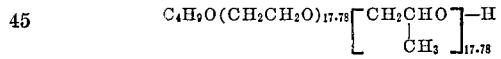

toluene (72 cc.), and a catalyst solution (0.375 cc.) containing 2.25 mg. of platinum and prepared by diluting with six times its volume of toluene the catalyst solution according to Example 1 of French patent specification No. 1,367,044. The mixture was refluxed for 1½ hrs., during which operation, 94% of the theoretical quantity of hydrogen resulting from the condensation of half of the Si-H bonds of α,ω-bis-dihydromethylsilyl - polydimethylsiloxane with the hydroxy group of the butyl monoether of polyethylene - polyisopropylene - glycol, was evolved. Infra-red spectral analysis indicated absorption bands similar to those indicated in Example 1 in regard to the groups

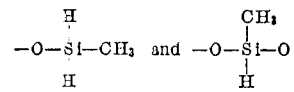

The refluxing mixture was then treated over 10 mins. through the dropping funnel with a dry dehydrated solution of an allyl monoether (104.2 g.; 0.05 mol) of a polyethylene-polyisopropylene-glycol of the average formula:

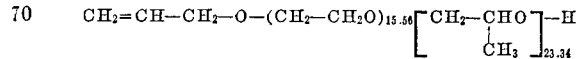

in toluene (180 cc.) and the avove catalyst solution (0.375 cc.), and was refluxed for 9 hrs., cooled to 50° C. and sodium bicarbonate (20.5 g.) added. After stirring at 50° C. for 30 min., the toluene was removed under a progressive vacuum down to 8 mm. Hg, at 75° C. Filtration gave a slightly brownish clear oil (239 g.) [viscosity at 25° C.: 3480 cst.; percent hydrogen by weight in the form of Si—H bonds: 0.0071 (83% of conversion of the Si—H bonds); percent vinyl groupings by weight: 0.28% (49% conversion of the vinyl groups)].

EXAMPLE 4

The tetrahydropolysiloxane (46 g.; 0.025 mol) employed in Example 2, toluene (145 cc.) in a one-litre round-bottomed flask equipped as in Example 1 was azeotropically dehydrated by removal of toluene (12 cc.) and the refluxing mixture was treated through the dropping funnel over 5 mins. with a dry mixture of the butyl monoether (85 g.; 0.05 mol) of the polyethylene-polyisopropylene-glycol employed in Example 1 in toluene (50 cc.) and 0.3 cc. of hexachloroplatinic acid hexahydrate (0.0833 g. of platinum/100 cc. or in the above butyl monoether/0.25 mg. of platinum). After heating for 7 hrs., about 95% of the theoretical hydrogen emanating from the reaction of one half of the Si—H bonds of the polysiloxane with the hydroxy group of the polyethylene-polyisopropylene-glycol monoether was produced.

As in the preceding examples, it was verified from the infra-red spectra that the characteristic absorption bands of the methyl dihydrosilyl groups had disappeared.

A refluxing solution of an allyl-butyl diether (108 g.; 0.05 mol) of a polyethylene-polyisopropylene-glycol of the average formula:

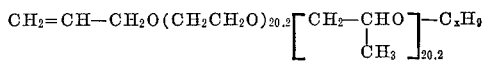

in toluene (170 cc.) and the above catalyst solution (1.5 cc. containing 1.25 mg. of platinum) in a flask equipped as above, was treated through the dropping funnel over 5 mins. with the above mixture, refluxed for 4 hrs., treated with the catalyst solution (1.8 cc. containing 1.5 mg. of platinum) and refluxed for 4 hrs. The product was moderately heated to about 95° C. and the toluene eliminated under progressive pressure finally reaching a vacuum of 6 mm. Hg and a temperature of 80° C., to give a brown-coloured clear oil (235 g.) [viscosity at 25° C.: 4760 cst.; percent of hydrogen by weight in the form of Si—H bonds: 0.0014 (96.6% conversion of the Si—H bonds); percent of vinyl groupings: 0.118 (79% conversion of the vinyl groups)].

EXAMPLE 5

An α,ω-bis-(dihydromethylsilyl)polydimethylsiloxane (860 g.; 0.5 mol) of the average formula:

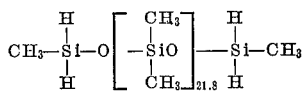

and toluene (2.2 l.) in a 20-litre round-bottomed flask equipped as described in Example 1 was azeotropically dehydrated by removal of toluene (115 cc.) and the refluxing mixture treated over ¾ hr. through the dropping funnel with a dry solution of a butyl monoether (1.7 kg.; 1 mol) of a polyethylene-polyisopropylene-glycol of the average formula:

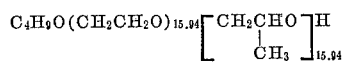

toluene (1.15 l.), and catalyst solution (3.8 cc. containing 10 mg. of platinum prepared by diluting with 6 times its volume of toluene the catalyst solution according to Example 1 of French Pat. 1,367,044.

The mixture was refluxed for 4 hrs., during which time 100% of the theoretical hydrogen resulting from the condensation of one half of the Si—H bonds of the α,ω-bis-(dihydromethylsilyl)polydimethlysiloxane with the hydroxy group of the butyl monoether of polyethylene-polyisopropylene-glycol was evolved. Infra-red spectral analysis indicated absorption bands similar to those in Example 1 in regard to the groups:

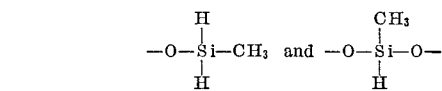

The refluxing mixture was then treated over 10 mins. through the dropping funnel with a dry solution of an allyl monoether (2.015 kg.; 1.1 mol) of a polyethylene-polyisopropylene-glycol of the average formula:

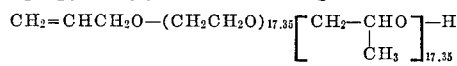

toluene (3.45 l.) and the above catalyst solution (49 cc. containing 130 mg. of platinum), refluxed for 3 hr., catalyst solution (26.5 cc. containing 70 mg. of Pt) added, refluxing continued for a further 3 hr., the product cooled to 50° C. and then sodium bicarbonate (60 g.) added. After agitation at 50° C. for ½ hr., the toluene was removed under a progressive vacuum down to 15 mm. Hg at 80° C. Filtration gave a slightly brownish clear oil (4215 g.) [viscosity at 25° C.: 5550 cst.; percent of hydrogen by weight in the form of Si—H bonds: nil (100% conversion of the Si—H bonds); percent of vinyl groupings by weight: 0.057%, (a nearly 100% conversion of the vinyl groups, taking into account the excess initially introduced)].

EXAMPLE 6

In order to show clearly the surface-active properties of the various oils prepared in the preceding examples, a specimen of each of these oils was separately used in a formulation for the production of polyurethane foams, the process being as follows. Tolylene diisocyanate (28.4 g.) (a 80:20 mixture of the 2,4- and 2,6-isomers) were added with stirring to a polyalkylene-triol (100 g.) (molecular weight: 3,400) containing both $-(CH_2CH_2O)-$ and

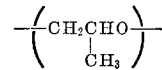

units, triethylene diamine (0.2 g.) in water (2 g.), stannous octoate (0.15 g.), N-methylmorpholine (1 g.), trichlorofluoromethane (10 g.) and the above oil (1 g.).

When the mixture started to foam, it was poured into a mould to give, after 2½ to 3 min. a cellular product of fine regular structure of density between about 30 and 32 g./l.

The same experiments carried out with 0.75 g. of the surface-active oil instead of 1 g. give substantially the same results.

A cube having sides of 5 cm. taken from the centre of these various foams was placed in a gas flow of 6 m.³/hr., one of the faces of the cube being perpendicular to the flow of gas. It was found that the additional loss of pressure created by this cube is only 2 cm. of water, which indicates the high percentage of open cells in the foam.

EXAMPLE 7

A refluxing mixture of α,ω-bis-(dihydromethylsilyl) polydimethylsiloxane of the average formula:

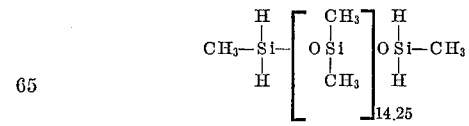

and toluene (300 cc.) in a two-litre round-bottomed flask equipped as in Example 1 was treated over 30 min. through the dropping funnel with a dry solution of a poly-ethylene-glycol (120 g.; 0.2 mol; molecular weight about 600) having the average formula:

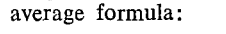

toluene (300 cc.) and hexachloroplatinic acid hexahydrate in the butylallyl diether of polyethylene-polyisopropylene-glycol mentioned below (0.4 cc. containing 1.06 mg. of platinum) and was then refluxed for 15 minutes; the volume of hydrogen evolved was 100% of the theoretical volume corresponding to the total reaction of half of the Si—H groups of the tetrahydropolysiloxane with one half of the hydroxyl groups of the polyethylene-glycol.

The refluxing solution was then treated over 20 min. through the dropping funnel with a dry mixture of an allyl-butyl diether (396 g.; 0.22 mol) of a polyethylene-polyisopropylene-glycol (molecular weight 1800) having the average formula:

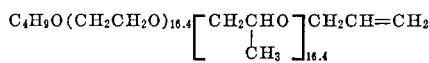

toluene (300 cc.) and the catalyst solution already employed (10.8 cc. containing 29 mg. of platinum), and refluxing was maintained for 3 hr., the catalyst solution (5.5 cc. containing 15 mg. of platinum) added and boiling continued for a further 3 hr.; the solvent was eliminated by distillation under reduced pressure to give a clear oil (618.6 g.) [viscosity 3480 cst. at 25° C.); percent by weight of hydrogen present in the form of Si—H groups: 0.003% (99.9% conversion of the Si—H groups); percent by weight of vinyl groups: 0.086% (100% conversion of these groups)].

In order clearly to show the surface-active properties of the oil thus prepared, the following test was performed. A polyether (293 g.; molecular weight: 800), obtained by linking ethylene oxide to a glucide, trichlorofluoromethane (102.5 g.) 1,4-diaza-(2,2,2)bicyclooctane (0.73 g.), and the above oil (2.90 g.) was added with stirring to a prepolymer (293 g.) obtained by reaction of tolylene diisocyanate (80 parts) and the above polyether (20 parts).

When foaming started, the mixture was poured into a mould and, when the expansion was complete after about 5 min., the mould was left for 12 hr.

The rigid foam thus obtained had a regular structure consisting of about 530 closed cells/sq. cm., and had a density which ranged only betwen 30.9 and 30.6 g./l. from the bottom of this foam to the top.

We claim:
1. A liquid copolymer of general Formula I

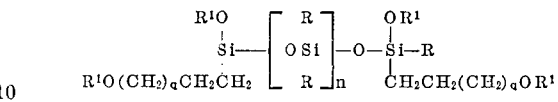

wherein R is an unsubstituted or halo- or cyano-substituted lower alkyl group, or unsubstituted or mono- or dihalo-substituted cyclo-alkyl group having up to 6 ring carbon atoms, or phenyl, alkylphenyl, or phenylalkyl group, $n$ is a number between 2 and 700, $q$ is 0 or a number up to 3, and $R^1O$— is a group of general formula $A(C_xH_{2x}O)_y$, wherein $x$ is a number from 2 to 4, $y$ is a munber of at least one, and A is a hydroxy, formyloxy, —OG, OCOG,

—NHG, —OCONHG, or —NHCOG, wherein G is a hydrocarbon radical having up to 30 carbon atoms, the groups $C_xH_{2x}$ being the same or different when $y$ is greater than one.

2. A copolymer according to claim 1, wherein R is a saturated alkyl group having up to 4 carbon atoms.

3. A copolymer according to claim 2, wherein R is a methyl group.

4. A copolymer according to claim 1, wherein the group $C_xH_{2x}$ is an ethylene or isopropylene group.

5. A copolymer according to claim 1, wherein A is a butyloxy or acetoxy group.

6. A copolymer according to claim 1, wherein $q$ is one.

7. A copolymer according to claim 1 of general formula

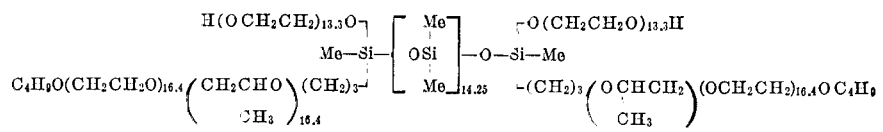

8. A copolymer according to claim 1 of general formula

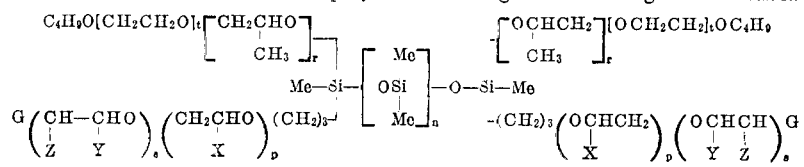

wherein $n$ is 21.75, $t$ and $r$ are 15.94, X is methyl, Y and Z are hydrogen, $s$ and $p$ are 15.65 and G is acetoxy.

9. A copolymer according to claim 1 of general formula

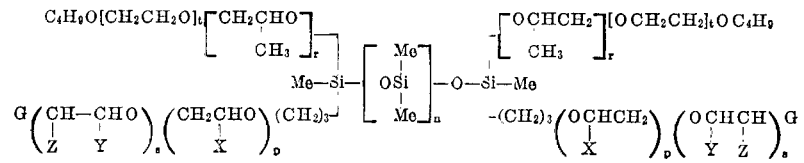

wherein $n$ is 23.4, $t$ and $r$ are 15.94, X and Z are hydrogen, Y is methyl, $p$ and $s$ are 20.2 and G is butyloxy.

10. A copolymer according to claim 1 of general formula

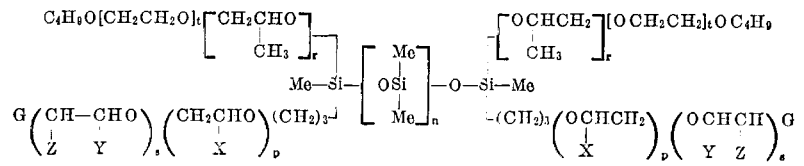

wherein $n$ is 23.4, $t$ and $r$ are 17.78, X and Y are hydrogen, Z is methyl, $p$ is 15.56, $s$ is 23.34 and G is hydroxy.

11. A copolymer according to claim 1 of general formula

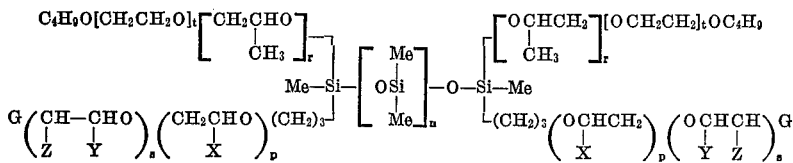

wherein $n$ is 23.4, $t$ and $r$ are 15.94, X and Y are hydrogen, Z is methyl, $p$ and $s$ are 20.2, and G is butyloxy.

12. A copolymer according to claim 1 of general formula

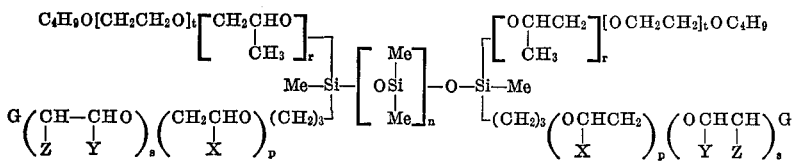

wherein $n$ is 21.8, $t$ and $r$ are 15.94, X and Y are hydrogen, Z is methyl, $p$ and $s$ are 17.35 and G is hydroxy.

References Cited

UNITED STATES PATENTS

| | | | |
|---|---|---|---|
| 3,168,543 | 2/1965 | Black et al. | 260—448.2(B) |
| 3,172,899 | 3/1965 | Bailey | 260—448.2(B) |
| 3,280,160 | 10/1966 | Bailey | 260—448.2(B) |
| 3,398,104 | 8/1968 | Haluska | 260—448.2X |
| 3,402,192 | 9/1968 | Haluska | 260—448.2(B) |

TOBIAS E. LEVOW, Primary Examiner

P. F. SHAVER, Assistant Examiner

U.S Cl. X.R.

260—2.5